No. 897,968. PATENTED SEPT. 8, 1908.
L. FAIR.
GEARING.
APPLICATION FILED NOV. 21, 1907.

Witnesses
J. E. Miller
M. T. Miller

Inventor
Levi Fair
By
Attorneys

UNITED STATES PATENT OFFICE.

LEVI FAIR, OF LIBERTY, KENTUCKY.

GEARING.

No. 897,968.  Specification of Letters Patent.  Patented Sept. 8, 1908.

Application filed November 21, 1907. Serial No. 403,237.

*To all whom it may concern:*

Be it known that I, LEVI FAIR, a citizen of the United States, residing at Liberty, in the county of Casey, State of Kentucky, have invented a certain new and useful Improvement in Gearing; and I do hereby declare the following to be a full, clear, and exact description of the invention, such as will enable others skilled in the art to which it appertains to make and use the same.

This invention relates to a new and useful improvement in gearing.

The aim of my invention is to directly connect the governor of a steam engine to the crank shaft of the engine in a neat, simple and efficient manner.

Figure 1:
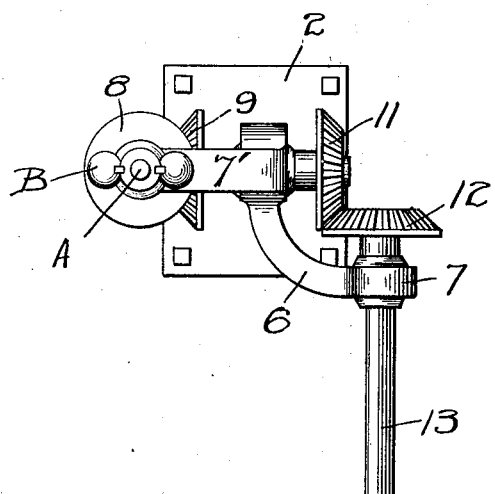
Figure 2:
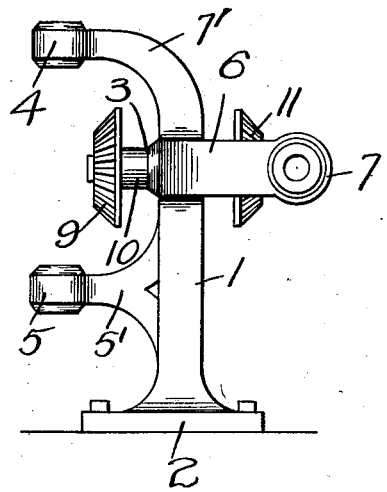
Figure 3:
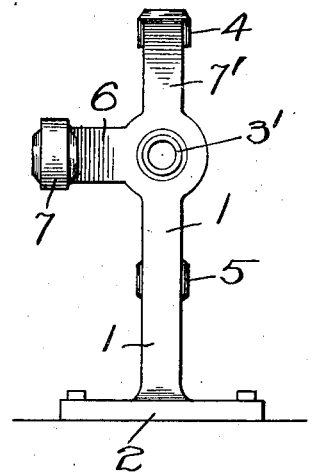

In the accompanying drawings I have shown in Figure 1 a top view of a gearing embodying my invention. Fig. 2 shows an elevation of the bearing post as used in my invention, while, Fig. 3 shows an elevation of the bearing post disclosing an edge view of the lateral bearing as used in my invention.

Where the governors of steam engines are connected to the engine by means of leather or other belting there is a likelihood of the belt breaking and slipping causing the engine to "run away".

The aim of my invention is to positively and directly connect the governor to the main driving shaft of the engine in a simple way and this I accomplish in providing the bearing post 16 supporting the crank shaft D of the engine with a bracket 15 provided at the end with a collar bearing 14. This shaft D is provided with the usual crank disk 23 and a bevel gear 22. At a suitable point at right angles to the shaft D I position a triple-bearing post 1 having the base flange 2 by means of which this bearing post may be secured. This post intermediate of its ends is provided with the central bearing 3 and laterally extending from this bearing is the bracket 6 having a collar bearing 7 in direct alinement with the collar bearing 14.

A suitable shaft 13 is held within the bearings 7 and 14 and is provided at one end with a bevel gear 20 meshing with the gear 22 upon the crank shaft D of the engine while the opposite end is provided with the bevel gear 12. To further guide this shaft 13 I provide the crank shaft D with the bearing collar 17 having a suitable socket within which the end 18 of the shaft 13 rotates so that this shaft 13 is securely but revolubly supported.

Within the central bearing 3 is a stub shaft 10 provided with a bevel gear 9 shown in Fig. 2 while at the other end the shaft 10 is provided with the bevel gear 11.

Arching upward from the central bearing 3 is the bracket 7' provided with a terminal bearing 4 while in alinement with this bearing 4 is a bearing 5 secured by means of the bracket 5' as clearly disclosed in Fig. 2.

The bevel gears 11 and 12 mesh while secured to the vertical governor shaft A held within the bearings 4 and 5 and supporting a governor B of any approved type is the bevel gear 8 meshing with the bevel gear 9.

By these means I directly connect the governor to the driving shaft of the engine as shown; and

Having thus described my said invention what I claim is

The combination with the driving shaft of an engine, of a gear upon said driving shaft, a bearing supporting one end of said shaft, and having an arm projecting therefrom terminating in a collar bearing, a bearing post having an intermediate bearing and a bracket laterally extending and provided with a collar bearing, a shaft held within said two mentioned collar bearings, a bevel gear upon each end of said shaft one of said gears meshing with the gear upon said driving shaft, a stub shaft within said intermediate bearing, a bevel gear upon each end of said shaft one of said bevel gears meshing with one of the bevel gears upon said last mentioned shaft, said bearing post having a bracket arching upwardly from said intermediate bearing and terminating in a collar bearing and a second bracket extending from said bearing post and terminating in a collar bearing registering with said last mentioned collar bearing and a governor shaft within said last two mentioned bearings in gear connection with said stub shaft as disclosed.

In testimony whereof, I affix my signature, in presence of two witnesses.

LEVI FAIR.

Witnesses.:
 E. C. MOON,
 M. L. SHARP.